US009398609B2

(12) United States Patent
Guo et al.

(10) Patent No.: US 9,398,609 B2
(45) Date of Patent: Jul. 19, 2016

(54) METHOD FOR USE IN BS (RE) CONFIGURING UE TO SWITCH FROM FIXED UL-DL TDD CONFIGURATION TO FLEXIBLE UL-DL TDD CONFIGURATION, AND BS

(71) Applicant: Telefonaktiebolaget L M Ericsson (publ), Stockholm (SE)

(72) Inventors: Zhiheng Guo, Beijing (CN); Shaohua Li, Beijing (CN); Xinghua Song, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 163 days.

(21) Appl. No.: 14/388,223

(22) PCT Filed: Jun. 11, 2013

(86) PCT No.: PCT/CN2013/077124
§ 371 (c)(1),
(2) Date: Sep. 25, 2014

(87) PCT Pub. No.: WO2014/186993
PCT Pub. Date: Nov. 27, 2014

(65) Prior Publication Data
US 2016/0174245 A1   Jun. 16, 2016

(30) Foreign Application Priority Data
May 21, 2013 (WO) ............... PCT/CN2013/075992

(51) Int. Cl.
H04J 3/00 (2006.01)
H04W 72/12 (2009.01)
H04W 72/04 (2009.01)
H04L 5/14 (2006.01)

(52) U.S. Cl.
CPC ......... *H04W 72/1273* (2013.01); *H04L 5/1469* (2013.01); *H04W 72/042* (2013.01); *H04W 72/0413* (2013.01); *H04W 72/0446* (2013.01)

(58) Field of Classification Search
USPC ................................. 370/280, 294, 252, 328
See application file for complete search history.

(56) References Cited

U.S. PATENT DOCUMENTS

2013/0083704 A1   4/2013  Gaal et al.
2013/0194980 A1*  8/2013  Yin ....................... H04L 1/1854
                                             370/280

(Continued)

FOREIGN PATENT DOCUMENTS

CN    102196596 A    9/2011
CN    102572985 A    7/2012

OTHER PUBLICATIONS

International Search Report and Written Opinion, Application No. PCT/CN2013/077124, dated Feb. 27, 2014, 10 pages.
R1-130558, "Signalling support for dynamic TDD," Jan. 28-Feb. 1, 2013, 3 pages, Ericsson, ST-Ericsson, 3GPP TSG-RAN WG1 #72, St. Julian's, Malta.

(Continued)

*Primary Examiner* — Duc C Ho
(74) *Attorney, Agent, or Firm* — Nicholson De Vos Webster & Elliott LLP

(57) ABSTRACT

The present disclosure relates to a method for a base station (BS) BS (re)configuring a user equipment (UE) to switch from a fixed uplink-downlink time division duplex (UL-DL TDD) configuration to a flexible UL-DL TDD configuration. In the method, a signaling message to switch the UE from the fixed UL-DL TDD configuration to the flexible UL-DL TDD configuration is sent to the UE. Then, a set of DL subframes is determined based on the fixed UL-DL TDD configuration and a reference DL TDD configuration of the flexible UL-DL TDD configuration. Thereafter, DL transmissions for the UE are scheduled only within the determined set of DL subframes. The present disclosure also relates to a BS for implementing the method.

24 Claims, 6 Drawing Sheets

(56) References Cited

U.S. PATENT DOCUMENTS

| | | |
|---|---|---|
| 2014/0086112 A1* | 3/2014 | Stern-Berkowitz ........ H04W 72/1289 370/280 |
| 2014/0161001 A1 | 6/2014 | Gao et al. |
| 2014/0293843 A1* | 10/2014 | Papasakellariou .. H04W 72/042 370/280 |
| 2016/0056947 A1* | 2/2016 | Tiirola ................... H04L 5/003 370/280 |

OTHER PUBLICATIONS

ETSI TS 136 213, Technical Specification, "LTE; Evolved Universal Terrestrial Radio Access (E-UTRA); Physical layer procedures (3GPP TS 36.213 version 11.1.0 Release 11)," Feb. 2013, 162 pages, European Telecommunications Standards Institute.

Office Action for Bangladesh Application No. 34/2014, mailed Jun. 24, 2015, 1 page.

* cited by examiner

METHOD FOR USE IN BS (RE) CONFIGURING UE TO SWITCH FROM FIXED UL-DL TDD CONFIGURATION TO FLEXIBLE UL-DL TDD CONFIGURATION, AND BS

CROSS-REFERENCE TO RELATED APPLICATIONS

This application is a National stage of International Application No. PCT/CN2013/077124, filed Jun. 11, 2013, which claims priority to International Application No. PCT/CN2013/075992, filed May 21, 2013, which are hereby incorporated by reference.

TECHNICAL FIELD

The technology presented in this disclosure generally relate to radio communication networks, particularly (though not exclusively) radio communication networks using Time Division Duplex (TDD), for example Long-Term Evolution (LTE) TDD. More particularly, the present disclosure relates to a method for use in a base station (BS) (re)configuring a user equipment (UE) to switch from a fixed uplink-downlink (UL-DL) time division duplex (TDD) configuration to a flexible UL-DL TDD configuration, and a BS for implementing the same.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a typical cellular radio system, user equipments (UEs) can communicate via a radio access network (RAN) to one or more core networks (CN). The RAN generally covers a geographical area which is divided into radio cell areas. Each radio cell area can be served by a base station (BS), e.g., a radio base station (RBS), which in some networks may also be called, for example, a "NodeB" (UMTS) or "eNodeB (eNB)" (LTE). A radio cell is a geographical area where radio coverage is generally provided by the radio base station at a base station site. Each radio cell can be identified by an identity within the local radio area, which is broadcast in the radio cell. The base stations communicate over the air interface operating on radio frequencies with the UEs within range of the base stations. In some radio access networks, several base stations may be connected (for example, by landlines or microwave) to a radio network controller (RNC) or a base station controller (BSC). The radio network controller may be configured to supervise and coordinate the various activities of the plurality of base stations connected thereto. The radio network controllers may also be connected to one or more core networks.

The Universal Mobile Telecommunications System (UMTS) is a third generation mobile communication system, which evolved from the Global System for Mobile Communications (GSM). The Universal Terrestrial Radio Access Network (UTRAN) is essentially a radio access network using Wideband Code Division Multiple Access (WCDMA) for UEs. As an alternative to WCDMA, Time Division Synchronous Code Division Multiple Access (TD-SCDMA) could be used. In a standardization forum known as the Third Generation Partnership Project (3GPP), telecommunications suppliers propose and agree upon standards for third generation networks and UTRAN specifically, and investigate e.g. enhanced data rate and radio capacity. The 3GPP has undertaken to evolve the UTRAN and GSM based radio access network technologies. The first releases for the Evolved Universal Terrestrial Radio Access Network (E-UTRAN) specification have been issued. The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology where the radio base station nodes are connected to a core network (e.g., via Access Gateways (AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes referred to as a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain (or combinations thereof). In Frequency Division Duplex (FDD), downlink (DL) and uplink (UL) transmission take place in different, sufficiently separated, frequency bands. In Time Division Duplex (TDD), DL and UL transmission take place in different, non-overlapping time slots. Thus, TDD can operate in unpaired frequency spectrum, whereas FDD generally requires paired frequency spectrum.

Typically, a transmitted signal in a radio communication system is organized in some form of frame structure, or frame configuration. For example, LTE generally uses ten equally sized subframes 0-9 of length 1 ms per radio frame as illustrated in FIG. 1. In case of TDD as shown in FIG. 1, there is generally only a single carrier frequency, and UL and DL transmissions are separated in time. Because the same carrier frequency is used for UL and downlink transmission, both the base station and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes (e.g., subframe #1 and, in some cases, subframe #6) provide this guard time. A TDD special subframe is generally split into three parts: a downlink part (DwPTS), a guard period (GP), and an UL part (UpPTS). The remaining subframes are either allocated to UL or DL transmission. Example UL-DL TDD configurations (also referred to as "TDD configuration" in the present disclosure) are shown in Table 1 below. Also, exemplary special subframe configurations are shown in Table 2 below.

TABLE 1

Exemplary UL and DL configurations in TDD

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

Exemplary UL and DL configurations in TDD

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Example configurations of special subframe

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TDD allows for different asymmetries in terms of the amount of resources allocated for UL and DL transmission, respectively, by means of different DL/UL configurations. In LTE, there are seven different configurations, see FIG. 2. Generally speaking, to avoid significant interference between DL and UL transmissions between different radio cells, neighboring radio cells should have the same DL/UL configuration. Otherwise, UL transmission in one radio cell may interfere with DL transmission in the neighboring radio cell (and vice versa). As a result, the DL/UL asymmetry generally does not vary between radio cells. The DL/UL asymmetry configuration is signaled, i.e. communicated, as part of the system information and can remain fixed for a long time.

Consequently, the TDD networks generally use a fixed frame configuration where some subframes are UL and some are DL. This may prevent or at least limit the flexibility to adopt the UL and/or DL resource asymmetry to varying radio traffic situations.

In future networks, it is envisioned that we will see more and more localized traffic, where most of the users will be in hotspots, or in indoor areas, or in residential areas. These users will be located in clusters and will produce different UL and DL traffic at different time. This essentially means that a dynamic feature to adjust the UL and DL resources to instantaneous (or near instantaneous) traffic variations would be required in future local area cells.

TDD has a potential feature where the usable band can be configured in different time slots to either in UL or DL. It allows for asymmetric UL/DL allocation, which is a TDD-specific property, and not possible in FDD. There are seven different UL/DL allocations in LTE, providing 40%-90% DL resources.

In the current networks, UL/DL configuration is semi-statically configured, thus it may not match the instantaneous traffic situation. This will result in inefficient resource utilization in both UL and DL, especially in cells with a small number of users. In order to provide a more flexible TDD configuration, so-called Dynamic TDD (also sometimes referred to as Flexible TDD) has therefore been introduced. Thus, Dynamic TDD configures the TDD UL/DL asymmetry to current traffic situation in order to optimize user experience. Dynamic TDD provides the ability of a subframe to be configured as "flexible" subframe. As a result, some subframes can be configured dynamically as either for UL transmission or for DL transmission. The subframes can for example be configured as either for UL transmission or DL transmission depending on e.g. the radio traffic situation in a cell. Accordingly, Dynamic TDD can be expected to achieve promising performance improvement in TDD systems when there is a potential load imbalance between UL and DL. Besides, Dynamic TDD approach can also be utilized to reduce network energy consumption. It is expected that dynamic UL/DL allocation (hence referred in this section "Dynamic TDD") should provide a good match of allocated resources to instantaneous traffic.

The UL scheduling can be indicated by Downlink Control Information (DCI) format 0 or Physical Hybrid Automatic Repeat Request (HARQ) indicator channel (PHICH) in a DL subframe (referring to Section 8 in the 3GPP Technical Specification 3*GPP TS* 36.213, *"Evolved Universal Terrestrial Radio Access (E-UTRA); Physical layer procedures"*, v.11.1.0).

SUMMARY

It is in view of the above considerations and others that the various embodiments of the present technology have been made.

According to one aspect of the present disclosure, there is proposed a method for BS (re)configuring a UE to switch from a fixed UL-DL TDD configuration to a flexible UL-DL TDD configuration. In the method, a signaling message to switch the UE from the fixed UL-DL TDD configuration to the flexible UL-DL TDD configuration is sent to the UE. Then, a set of DL subframes is determined based on the fixed UL-DL TDD configuration and a reference DL TDD configuration of the flexible UL-DL TDD configuration. Thereafter, DL transmissions for the UE are scheduled only within the determined set of DL subframes.

According to another aspect of the present disclosure, there is proposed a BS for implementing the above method. The BS may include a sending unit configured to send, to a UE, a signaling message to switch the UE from a fixed uplink-downlink (UL-DL) time division duplex (TDD) configuration to the flexible UL-DL TDD configuration; a subframe set determining unit configured to determine a set of DL subframes based on the fixed UL-DL TDD configuration and a reference DL TDD configuration of the flexible UL-DL TDD configuration; and a scheduling unit configured to schedule DL transmissions for the UE only within the determined set of DL subframes.

Accordingly, UE's behavior is harmonized before and after the RRC reconfiguration taking effective, and eNB have no confusion on the ACK/NACK reported by the UE on either or both of PUCCH and PUSCH. In some embodiments, UE only reports ACK/NACK on subframe 2 and/or subframe 7, thus eNB does not have to reserve the flexible subframes for UE to report the ACK/NACK bits.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
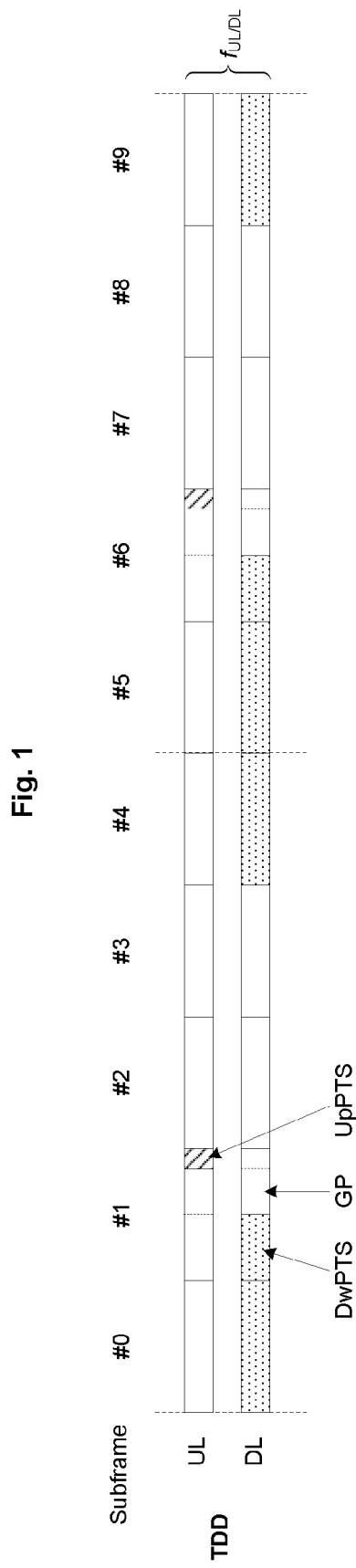
FIG. 1 illustrates uplink/downlink time/frequency structure for LTE TDD.

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. Similarly, it will be appreciated that any flow charts and the like represent various processes which may be substantially represented in computer readable medium and so executed by a computer or processor, whether or not such computer or processor is explicitly shown. The functions of the various elements including functional blocks labeled or described as "processor" may be provided through the use of dedicated hardware as well as hardware capable of executing software in the form of coded instructions stored on computer readable medium. When provided by a processor, the functions may be provided by a single dedicated processor, by a single shared processor, or by a plurality of individual processors, some of which may be shared or distributed. Such functions are to be understood as being computer-implemented and thus machine-implemented. Moreover, use of the term "processor" or shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), access point, relay node, etcetera.

In L1 controlled dynamic TDD (referring to $R1-130558$ "Signalling support for dynamic TDD", Ericsson, ST-Ericsson), the UE will adjust its scheduling timing for UL and DL based on two reference TDD configurations respectively. The UE will schedule UL transmission based on a reference UL TDD configuration and schedule DL transmissions based on a reference DL TDD configurations. One example is to schedule UL transmissions using TDD configuration 0 and to schedule DL transmissions using TDD configuration 1. In this case, subframe #4 and #9 are used as flexible subframes, which can be used as for either UL or DL.

The benefits with the L1 controlled dynamic TDD are in that it provides fully dynamic control giving the largest performance benefits. It also ensures that control signaling, other than DL scheduling, will not experience cross link interference. It has a natural way of handling HARQ continuity between switches. It also has minimum signaling overhead since the direction is controlled implicitly by the scheduling, which is needed for each transmission anyway.

In TDD, each UL subframe is associated with a set of DL subframes. The HARQ-ACK in response to DL transmissions in these subframes shall be transmitted in the associated UL subframe. The DL association set is defined as in Table 3 (referring to Section 8 in the 3GPP Technical Specification 3*GPP TS* 36.213, *"Evolved Universal Terrestrial Radio Access (E-UTRA); Physical layer procedures"*, v.11.1.0).

TABLE 3

| UL-DL Configuration | DL association set index K: {k₀, k₁, ... k_{M-1}} for TDD Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Dynamic TDD may not always be enabled for all the UEs. To keep backward compatibility, it is highly possible that Dynamic TDD is configurable via dedicated signaling, i.e., the eNB may send RRC signaling to the UE to enable Dynamic TDD.

Figure 3:
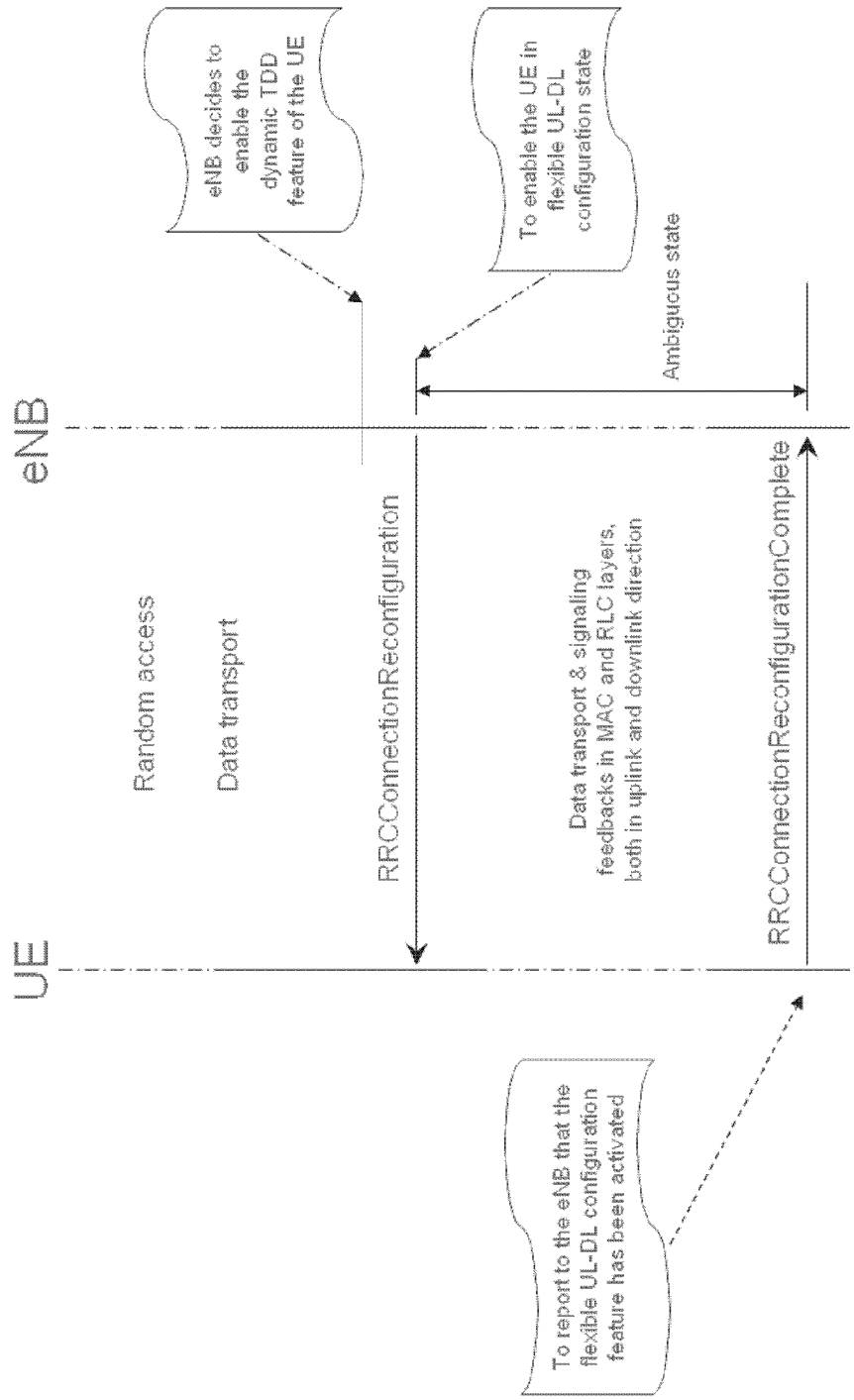
FIG. 3 is a schematic sequence diagram to show the mode switching between fixed TDD and flexible TDD.

FIG. 3 is a schematic sequence diagram to show the mode switching between fixed TDD and flexible TDD.

As shown in FIG. 3, there will two UE states during the switching period, one is fixed UL-DL TDD configuration and the other is dynamic TDD.

Figure 2:
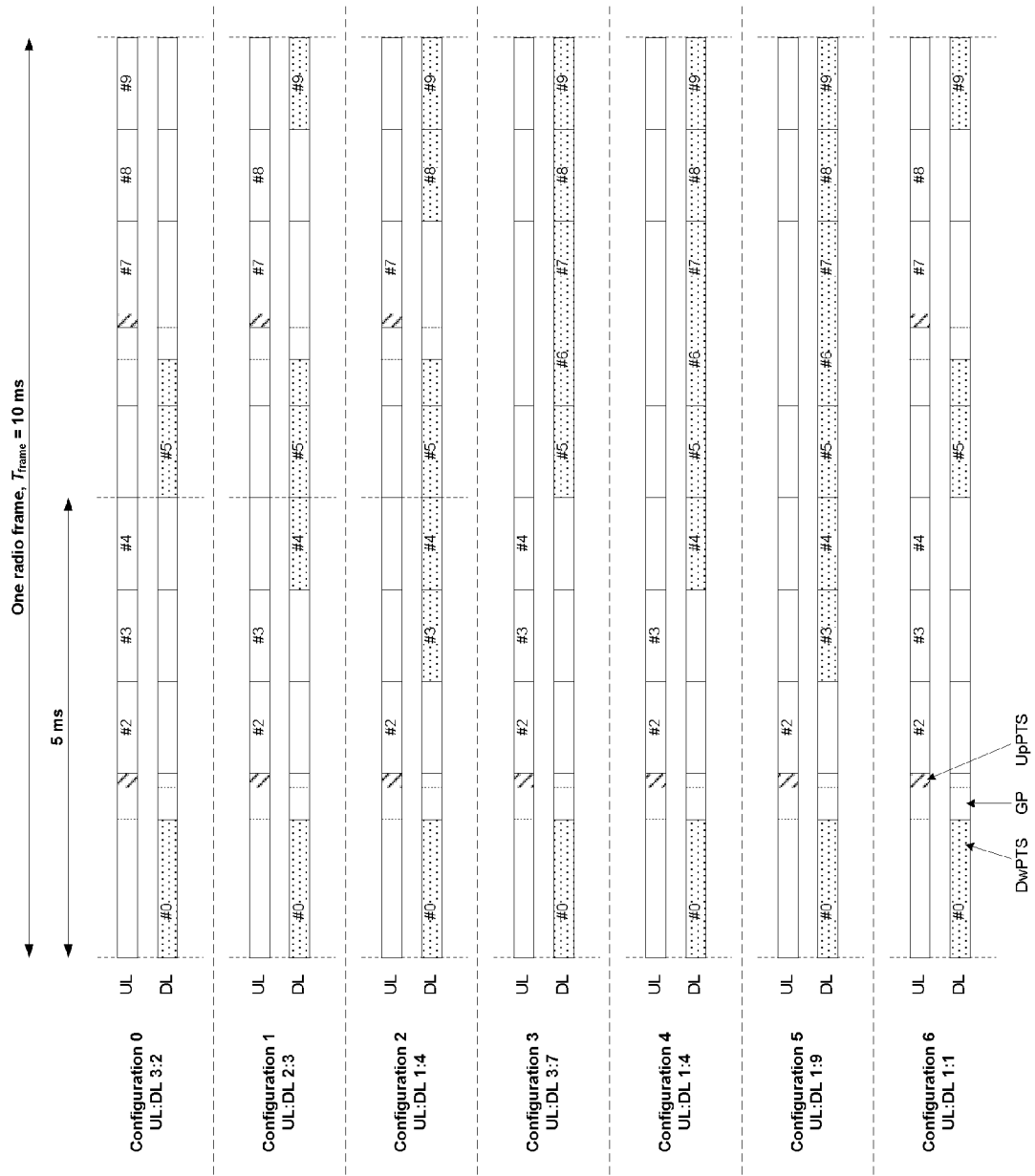
FIG. 2 is a diagram illustrating an example of seven different downlink/uplink configurations for LTE TDD.

For UEs in the fixed UL-DL TDD configuration state, these UEs will use the reference UL TDD configuration for both UL and DL transmissions, e.g., UL-DL TDD configuration 0 as exemplified in FIG. 2. In this state, the UEs' behavior has no difference with legacy UEs. In particular, the ULACK/NACK reporting procedure is the same as legacy UEs.

For UEs in the flexible UL-DL TDD configuration state (dynamic TDD), these UEs will use the reference UL TDD configuration for UL transmission and use the reference DL TDD configuration for DL transmissions. For example, the UL scheduling follows UL-DL TDD configuration 0 while the DL scheduling follows UL-DL TDD configuration 2. Moreover, the ULACK/NACK reporting corresponding to the DL transmissions also naturally follows UL-DL TDD configuration 2 since there are more ACK/NACK bits need to be reported on the UL in dynamic TDD mode than in UL-DL TDD configuration 0.

Before dynamic TDD is enabled, a UE uses UL-DL TDD configuration 0; and upon receiving the RRC reconfiguration signaling, the UE will start to work with dynamic TDD. The procedures and L1 parameters are not the same before and after dynamic TDD is enabled.

As shown in FIG. 3, eNB can only be sure that dynamic TDD is functioning at a UE when a message RRCConnectionReconfigurationComplete is received. Therefore, after RRCConnectionReconfiguration is sent but before RRCConnectionReconfigurationComplete is received, eNB cannot exactly know the UE's state, i.e., in fixed UL-DL TDD configuration or in flexible UL-DL TDD configuration, and therefore cannot exactly know in which sub-frame the UE are performing transmission by using the procedures/parameters for the dynamic TDD. That is, UE's state is ambiguous to eNB. In this ambiguous state, the behaviors of eNB and UE are both affected.

The issues related to the DL scheduling and UL ACK/NACK feedback during this ambiguous state are considered in this disclosure.

In details, the following issue is observed by the present inventors.

When DL transmissions are scheduled in subframe 0 or subframe 5, the ACK/NACK feedback subframe is not known to eNB during the ambiguous state.

For example, before dynamic TDD is enabled, a UE is working with UL-DL TDD configuration 0. When the UE is scheduled in subframe 0, the ACK/NACK will be reported by the UE in subframe 4, but subframe 4 is a flexible subframe, and it can be used as downlink. In dynamic TDD, the ACK/NACK bits will be reported in subframe 7. Therefore, eNB does not know where the ACK/NACK is reported in the ambiguous state.

The problem is the similar when a UE is scheduled in subframe 5.

When DL transmissions are only scheduled in the special subframe(s) (e.g., subframe 1 or subframe 6), the ACK/NACK report timing using PUCCH is not ambiguous. But the PUCCH resources that the UE is using for the ACK/NACK reporting are not known to the eNB.

According to the PUCCH resource allocation procedure in Section 10.1 in the 3GPP Technical Specification 3*GPP TS* 36.213, *"Evolved Universal Terrestrial Radio Access (E-UTRA); Physical layer procedures"*, v.11.1.0, during the ambiguous state, a UE may report the ACK/NACK bit in PUCCH resource calculated according to UL-DL TDD configuration 0 or UL-DL TDD configuration 2. eNB have no idea when the UE will use the PUCCH resources according to the dynamic TDD mode (where the PUCCH resources in dynamic TDD mode are calculated according the UL-DL TDD configuration 2).

When DL transmissions are only scheduled in the special subframe(s) (e.g., subframe 1 or subframe 6), the ACK/NACK report timing using PUSCH is not ambiguous. But the parameter ($N_{bundle}$) for the PUSCH report ACK/NACK is not known to eNB.

In dynamic TDD mode, $N_{bundle}$ is 1 for UL-DL TDD configuration 0; and in other UL-DL TDD configurations, the parameter $N_{bundle}$ is calculated according to DAI value in DCI format 0. However, in dynamic TDD mode, the two bit for DAI in DCI format 0 are always interpreted as UL index, there is no way to get DAI value carried by DCI format 0. Then the parameter $N_{bundle}$ cannot be obtained.

According to the proposed technical solution, a method for BS (re)configuring a UE to switch from a fixed UL-DL TDD configuration to a flexible UL-DL TDD configuration is proposed.

Figure 4:
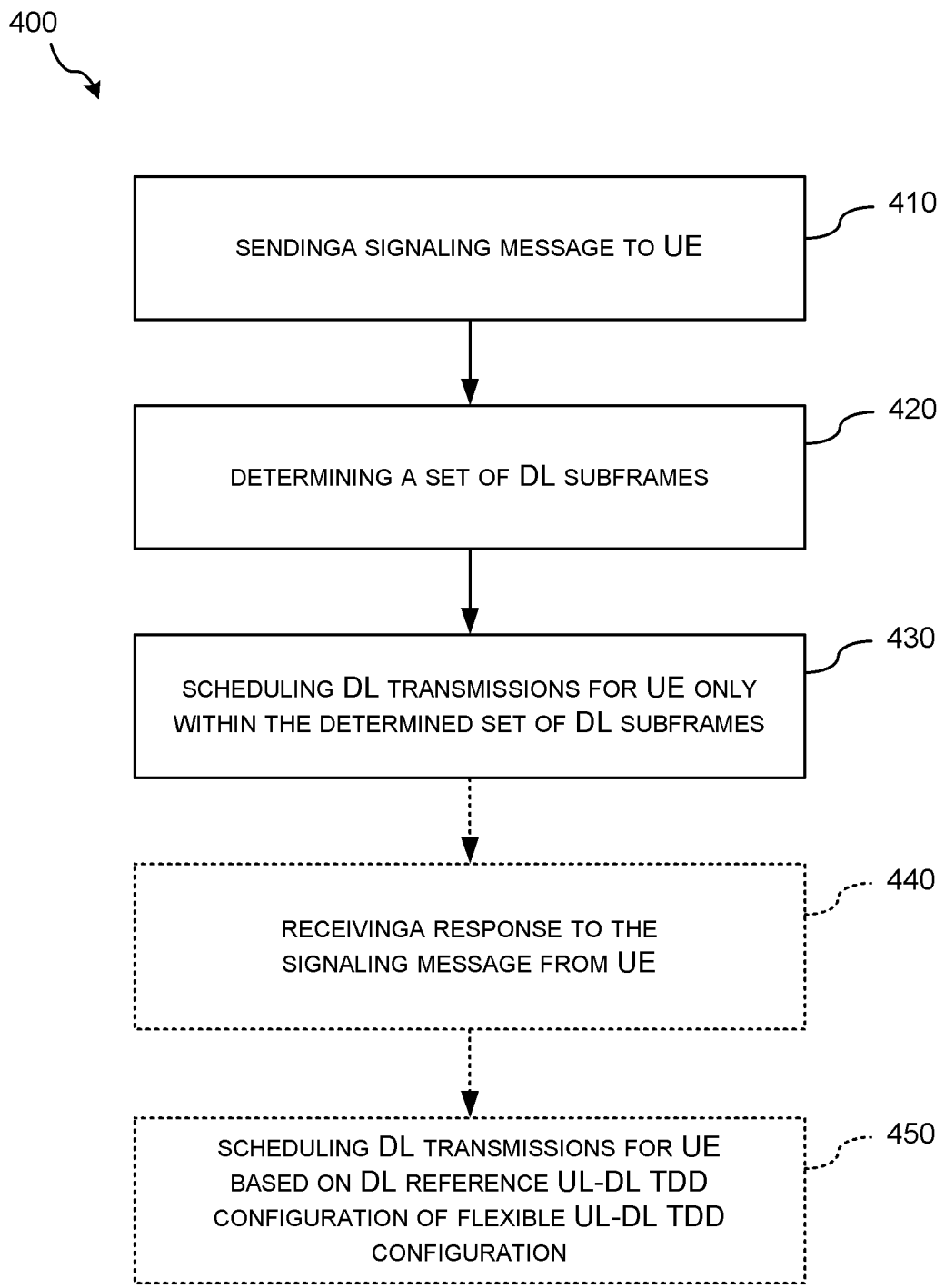
FIG. 4 is a flowchart showing the procedure of the method according to some embodiments of the present disclosure.

FIG. 4 shows a flowchart of the method 400 according to some embodiments of the present disclosure.

Referring to FIG. 4, a signaling message to switch the UE from the fixed UL-DL TDD configuration to the flexible UL-DL TDD configuration is sent to the UE (step S410). Then, a set of DL subframes is determined based on the fixed UL-DL TDD configuration and the flexible UL-DL TDD configuration (step S420). Thereafter, DL transmissions for the UE are scheduled only within the determined set of DL subframes (step S430).

In some embodiments, the method 400 may further include the following steps. These steps are also shown in FIG. 4 with dotted blocks. A response to the signaling message to confirm the completion of the switching is received from the UE (step S440). Then, DL transmissions for the UE is scheduled based on the reference DL TDD configuration of the flexible UL-DL TDD configuration (step S450).

In step S410, the signaling message may be a radio resource control (RRC) signaling, e.g., RRCConnectionReconfiguration. Accordingly, in step S440, the response may be a RRC signaling response, e.g., RRCConnectionReconfigurationComplete.

In step S420, a DL subframe having a UL subframe for acknowledgement (ACK) or non-acknowledgement (NACK) response common in both the fixed UL-DL TDD configuration and the reference DL TDD configuration of the flexible UL-DL TDD configuration can be determined as a DL subframe in the set of DL subframes. For example, recalling to FIG. 2 and Table 3, if the fixed UL-DL TDD configuration is UL-DL TDD configuration 0 and a reference DL TDD configuration of the flexible UL-DL TDD configuration is UL-DL TDD configuration 1, then the set of DL subframes can include subframe 1 and/or subframe 6; if the fixed UL-DL TDD configuration is UL-DL TDD configuration 0 and a reference DL TDD configuration of the flexible UL-DL TDD configuration is UL-DL TDD configuration 2, then the set of DL subframes can include subframe 1 and/or subframe 6; and if the fixed UL-DL TDD configuration is UL-DL TDD configuration 1 and a reference DL TDD configuration of the flexible UL-DL TDD configuration is UL-DL TDD configuration 2, then the set of DL subframes can include subframe 0, subframe 1, subframe 5 and/or subframe 6; vice versa.

As another example, in step S420, a DL subframe having the following properties can be determined as a DL subframe in the set of DL subframes:
the DL subframe per se is a fixed DL subframe in both the fixed UL-DL TDD configuration and the reference DL TDD configuration of the flexible UL-DL TDD configuration; and
a UL subframe associated with the DL subframe is a fixed UL subframe in both the fixed UL-DL TDD configuration and the reference DL TDD configuration of the flexible UL-DL TDD configuration.

For example, recalling to FIG. 2 and Table 3, if the fixed UL-DL TDD configuration is UL-DL TDD configuration 3 and a reference DL TDD configuration of the flexible UL-DL TDD configuration is UL-DL TDD configuration 6, then subframes 0, 1, 5, 6, and 9 are fixed DL subframes, subframes 2, 3 and 4 are fixed UL subframes, and subframes 7 and 8 are flexible subframes. The fixed DL subframes 0, 1, 5, 6, and 9 are now considered. In UL-DL TDD configuration 3, subframes 5 and 6 are both associated with subframe 2 (a fixed UL subframe), and subframe 9 is associated with subframe 4 (a fixed subframe). In UL-DL TDD configuration 6, subframe 5 is associated with subframe 2 (a fixed UL subframe), subframe 6 is associated with subframe 3 (a fixed subframe), and subframe 9 is associated with subframe 4 (a fixed UL subframe). Therefore, the set of DL subframes can include subframe 5, subframe 6 and/or subframe 9.

In a simpler manner, in assumption that the fixed UL-DL TDD configuration and the reference DL TDD configuration of the flexible UL-DL TDD configuration are both selected from a group consisting of UL-DL TDD configurations 0, 1 and 2, the set of DL subframes can be determined or pre-defined as subframe 1, subframe 6, or both subframe 1 and subframe 6. In this simpler situation, UE in ambiguous state will feedback UL hybrid automatic repeat request (HARQ) ACK or NACK (HARQ-ACK or HARQ-NACK) in fixed UL subframes regardless of the fixed or flexible UL-DL TDD configuration. Still with the above example, UL HARQ-ACK (HARQ-NACK) is expected in subframe 7, subframe 2, or both subframe 7 and subframe 2. UL HARQ-ACK (HARQ-NACK) will not be expected in the flexible subframes.

In some embodiments, in case where HARQ-ACK or HARQ-NACK is received on physical uplink control channel (PUCCH), the method 400 may further include a step of performing blind detection in PUCCH resources corresponding to both a reference UL TDD configuration and the reference DL TDD configuration of the flexible UL-DL TDD configuration, in UL subframes association with the determined set of DL subframes (not shown in FIG. 4). For a UE in ambiguous state, eNB has sent the RRC reconfiguration to the UE, but the eNB does not exactly know when the reconfiguration will take effective by the UE. UE may use PUCCH resources determined according to reference UL TDD configuration, e.g., UL-DL TDD configuration 0 or use the PUCCH resources determined according to reference DL TDD configuration, e.g., UL-DL TDD configuration 2. Because the PUCCH resources calculated according to the two reference TDD configurations are orthogonal to each other, it is possible for eNB to perform blind detection to decide which resources are used and the information carried in the corresponding resources.

In some embodiments, the above blind detection may be also used for eNB to judge whether the UE are in dynamic TDD mode or not. Therefore, the method 400 may further include steps of determining whether the UE is in the flexible UL-DL TDD configuration based on the result of the blind detection; and after the UE is determined in the flexible UL-DL TDD configuration, scheduling DL transmissions for the UE based on the reference DL TDD configuration of the flexible UL-DL TDD configuration.

In case HARQ-ACK or HARQ-NACK is received on PUCCH and HARQ-ACK or HARQ-NACK multiplexing is used, PUCCH ACK or NACK states are limited within a pre-defined set of states. In this situation, UE will always assume discontinuous transmission (DTX) for the subframes which do not belong to the determined set of DL subframes, when the UE is in the ambiguous state. It is equivalent to only select state from a pre-defined state subset for ACK/NAK report.

In some embodiments, in case where HARQ-ACK or HARQ-NACK is received on physical uplink shared channel (PUSCH) and HARQ-ACK or HARQ-NACK bundling is used, HARQ-ACK or HARQ-NACK bundling level ($N_{bundle}$) is pre-defined. One example of $N_{bundle}$ can be set to 1. As previously described, in the dynamic TDD mode, $N_{bundle}$ cannot be obtained by calculating according to DAI value in DCI format 0, because DAI value in DCI format 0 are always treated as UL index. In the other aspect, in fixed UL-DL TDD configuration mode (UL-DL TDD configuration index is 0), the parameter $N_{bundle}$ is 1. To avoid the confusion, the value of $N_{bundle}$ in the ambiguous state is set to 1 in dynamic TDD mode. Then, eNB does not have to know in which mode the UE is.

In some embodiments, in case where HARQ-ACK or HARQ-NACK is received on PUSCH and HARQ-ACK or HARQ-NACK multiplexing is used, HARQ-ACK or HARQ-NACK may be detected and decoded according to a pre-defined ACK or NACK encoding and mapping scheme. For example, the international PCT application No. PCT/

CN2013/070999 may be referred to as one example of this pre-defined ACK or NACK encoding and mapping scheme.

Accordingly, UE's behavior is harmonized before and after the RRC reconfiguration taking effective, and eNB have no confusion on the ACK/NACK reported by the UE on either or both of PUCCH and PUSCH. In some embodiments, UE only reports ACK/NACK on subframe 2 and/or subframe 7, thus eNB does not have to reserve the flexible subframes for UE to report the ACK/NACK bits.

Figure 5:
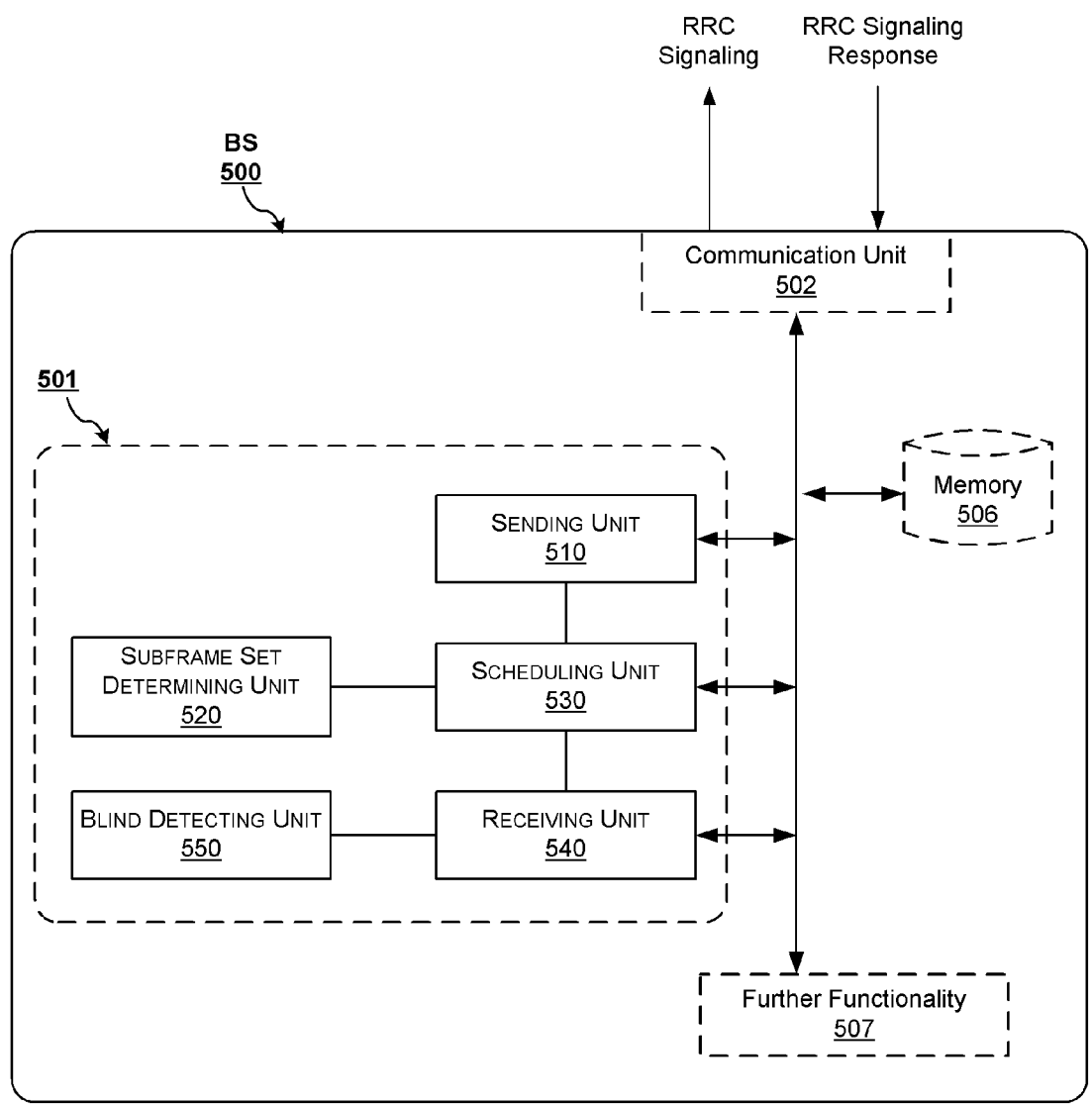
FIG. 5 is a schematic block diagram of BS according to some embodiments of the present disclosure.

FIG. 5 is a schematic block diagram of BS 500 according to some embodiments of the present disclosure.

The part of BS 500 which is most affected by the adaptation to the herein described method is illustrated as an arrangement 501, surrounded by a dashed line. The BS 500 could be e.g. an eNB, or a NodeB, depending on in which type of communication system it is operable, e.g., LTE-type systems. The BS 500 and arrangement 501 are further configured to communicate with other entities via a communication unit 502 which may be regarded as part of the arrangement 501. The communication unit 502 comprises means for wireless communication, and may comprise means for, e.g., wired communication. The arrangement 501 or BS 500 may further comprise other functional units 507, such as functional units providing regular eNB functions, and may further comprise one or more storage units 506.

The arrangement 501 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 4. The arrangement part of the BS 500 may be implemented and/or described as follows.

Referring to FIG. 5, BS 500 may include at least one or more from a sending unit 510, a subframe set determining unit 520, a scheduling unit 530, a receiving unit 540, a blind detecting unit 550.

The sending unit 510 may send to a UE a signaling message to switch the UE from a fixed UL-DL TDD configuration to a flexible UL-DL TDD configuration. The signaling message may be a radio resource control (RRC) signaling, e.g., RRC-ConnectionReconfiguration.

The subframe set determining unit 520 may determine a set of DL subframes based on the fixed UL-DL TDD configuration and a reference DL TDD configuration of the flexible UL-DL TDD configuration.

The scheduling unit 530 may schedule DL transmissions for the UE only within the determined set of DL subframes.

The receiving unit 540 may receive a response to the signaling message to confirm the completion of the switching from the UE. Accordingly, the response may be a RRC signaling response, e.g., RRCConnectionReconfigurationComplete. Thereafter, the scheduling unit 530 may schedule DL transmissions for the UE is scheduled based on the reference DL TDD configuration of the flexible UL-DL TDD configuration.

The subframe set determining unit 520 may determine a DL subframe having a UL subframe for ACK or NACK response common in both the fixed UL-DL TDD configuration and the reference DL TDD configuration of the flexible UL-DL TDD configuration as a DL subframe in the set of DL subframes. For example, recalling to FIG. 2 and Table 3, if the fixed UL-DL TDD configuration is UL-DL TDD configuration 1, then the set of DL subframes can include subframe 1 and/or subframe 6; if the fixed UL-DL TDD configuration is UL-DL TDD configuration 0 and a reference DL TDD configuration of the flexible UL-DL TDD configuration is UL-DL TDD configuration 2, then the set of DL subframes can include subframe 1 and/or subframe 6; and if the fixed UL-DL TDD configuration is UL-DL TDD configuration 1 and a reference DL TDD configuration of the flexible UL-DL TDD configuration is UL-DL TDD configuration 2, then the set of DL subframes can include subframe 0, subframe 1, subframe 5 and/or subframe 6; vice versa.

As another example, the subframe set determining unit 520 may determine a DL subframe having the following properties can be determined as a DL subframe in the set of DL subframes:

the DL subframe per se is a fixed DL subframe in both the fixed UL-DL TDD configuration and the reference DL TDD configuration of the flexible UL-DL TDD configuration; and a UL subframe associated with the DL subframe is a fixed UL subframe in both the fixed UL-DL TDD configuration and the reference DL TDD configuration of the flexible UL-DL TDD configuration.

For example, recalling to FIG. 2 and Table 3, if the fixed UL-DL TDD configuration is UL-DL TDD configuration 3 and a reference DL TDD configuration of the flexible UL-DL TDD configuration is UL-DL TDD configuration 6, then subframes 0, 1, 5, 6, and 9 are fixed DL subframes, subframes 2, 3 and 4 are fixed UL subframes, and subframes 7 and 8 are flexible subframes. The fixed DL subframes 0, 1, 5, 6, and 9 are now considered. In UL-DL TDD configuration 3, subframes 5 and 6 are both associated with subframe 2 (a fixed UL subframe), and subframe 9 is associated with subframe 4 (a fixed subframe). In UL-DL TDD configuration 6, subframe 5 is associated with subframe 2 (a fixed UL subframe), subframe 6 is associated with subframe 3 (a fixed subframe), and subframe 9 is associated with subframe 4 (a fixed UL subframe). Therefore, the set of DL subframes can include subframe 5, subframe 6 and/or subframe 9.

In a simpler manner, in assumption that the fixed UL-DL TDD configuration and the reference DL TDD configuration of the flexible UL-DL TDD configuration are both selected from a group consisting of UL-DL TDD configurations 0, 1 and 2, the subframe set determining unit 520 can simply determine or pre-define the set of DL subframes as subframe 1, subframe 6, or both subframe 1 and subframe 6. In this simpler situation, UE in ambiguous state will feedback UL HARQ-ACK or HARQ-NACK in fixed uplink subframes regardless of the fixed or flexible UL-DL TDD configuration. Still with the above example, UL HARQ-ACK (HARQ-NACK) is expected in subframe 7, subframe 2, or both subframe 7 and subframe 2. UL HARQ-ACK (HARQ-NACK) will not be expected in the flexible subframes.

In some embodiments, in case where HARQ-ACK or HARQ-NACK is received on PUCCH, the blind detecting unit 550 can be used to perform blind detection in PUCCH resources corresponding to both a reference UL TDD configuration and the reference DL TDD configuration of the flexible UL-DL TDD configuration, in UL subframes association with the determined set of DL subframes. For a UE in ambiguous state, eNB has sent the RRC reconfiguration to the UE, but the eNB does not exactly know when the reconfiguration will take effective by the UE. UE may use PUCCH resources determined according to reference UL TDD configuration, e.g., UL-DL TDD configuration 0 or use the PUCCH resources determined according to reference DL TDD configuration, e.g., UL-DL TDD configuration 2. Because the PUCCH resources calculated according to the two TDD configurations are orthogonal to each other, it is possible for eNB to perform blind detection to decide which resources are used and the information carried in the corresponding resources.

In some embodiments, the above blind detection may be also used for eNB to judge whether the UE are in dynamic TDD mode or not. Therefore, the scheduling unit 530 may determine whether the UE is in the flexible UL-DL TDD configuration based on the result of the blind detection; and if it is determined that the UE is in the flexible UL-DL TDD configuration, the scheduling unit 530 will schedule DL transmissions for the UE based on the reference DL TDD configuration of the flexible UL-DL TDD configuration.

In case HARQ-ACK or HARQ-NACK is received on PUCCH and HARQ-ACK or HARQ-NACK multiplexing is used, PUCCH ACK or NACK states are limited within a pre-defined set of states. In this situation, UE will always assume DTX for the subframes which do not belong to the determined set of DL subframes, when the UE is in the ambiguous state. It is equivalent to only select state from a pre-defined state subset for ACK/NAK report.

In some embodiments, in case where HARQ-ACK or HARQ-NACK is received on PUSCH and HARQ-ACK or HARQ-NACK bundling is used, HARQ-ACK or HARQ-NACK bundling level ($N_{bundle}$) is pre-defined. One example of $N_{bundle}$ can be set to 1. As previously described, in the dynamic TDD mode, $N_{bundle}$ cannot be obtained by calculating according to DAI value in DCI format 0, because DAI value in DCI format 0 are always treated as UL index. In the other aspect, in fixed UL-DL TDD configuration mode (UL-DL TDD configuration index is 0), the parameter $N_{bundle}$ is 1. To avoid the confusion, the value of $N_{bundle}$ in the ambiguous state is set to 1 in dynamic TDD mode. Then, eNB does not have to know in which mode the UE is.

In some embodiments, in case where HARQ-ACK or HARQ-NACK is received on PUSCH and HARQ-ACK or HARQ-NACK multiplexing is used, HARQ-ACK or HARQ-NACK may be detected and decoded according to a pre-defined ACK or NACK encoding and mapping scheme. For example, the international PCT application No. PCT/CN2013/070999 may be referred to as one example of this pre-defined ACK or NACK encoding and mapping scheme.

Accordingly, UE's behavior is harmonized before and after the RRC reconfiguration taking effective, and eNB have no confusion on the ACK/NACK reported by the UE on either of both of PUCCH and PUSCH. In some embodiments, UE only reports ACK/NACK on subframe 2 and/or subframe 7, thus eNB does not have to reserve the flexible subframes for UE to report the ACK/NACK bits.

Figure 6:
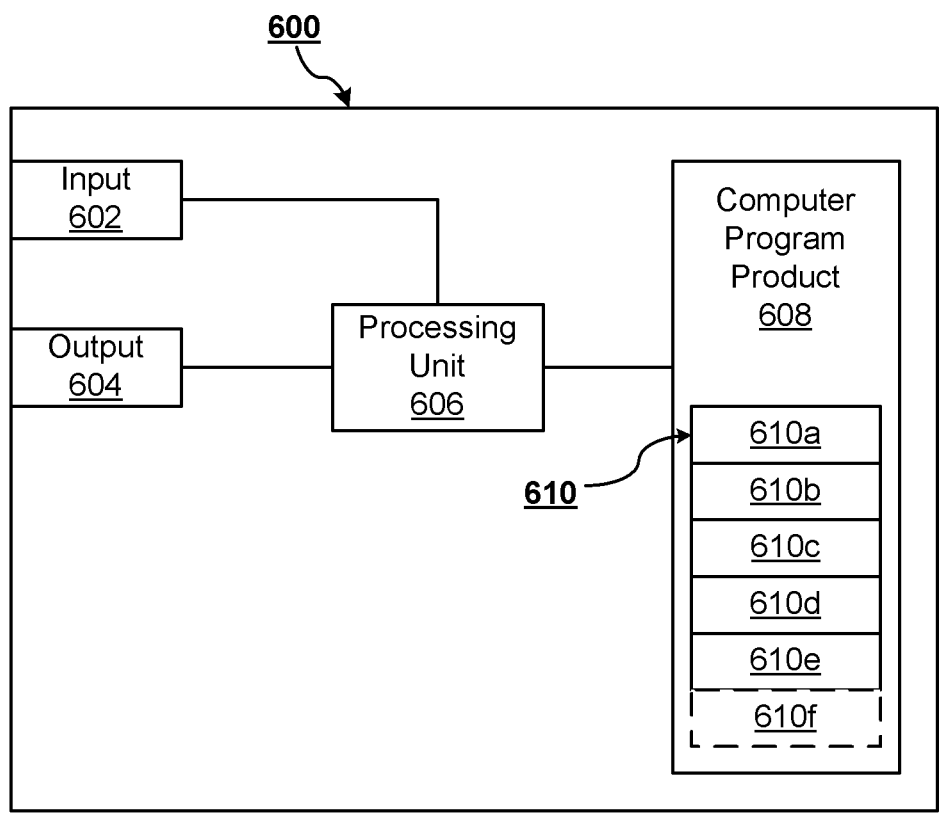
FIG. 6 is a schematic block diagram of arrangement according to some embodiments of the present disclosure.

FIG. 6 schematically shows an embodiment of an arrangement 600 which may be used in a BS 500. Comprised in the arrangement 600 are here a processing unit 606, e.g., with a Digital Signal Processor (DSP). The processing unit 606 may be a single unit or a plurality of units to perform different actions of procedures described herein. The arrangement 600 may also comprise an input unit 602 for receiving signals from other entities, and an output unit 604 for providing signal(s) to other entities. The input unit and the output unit may be arranged as an integrated entity or as illustrated in the example of FIG. 6.

Furthermore, the arrangement 600 comprises at least one computer program product 608 in the form of a non-volatile or volatile memory, e.g., an Electrically Erasable Programmable Read-Only Memory (EEPROM), a flash memory and a hard drive. The computer program product 608 comprises a computer program 610, which comprises code/computer readable instructions, which when executed by the processing unit 606 in the arrangement 600 causes the arrangement 600 and/or the BS in which it is comprised to perform the actions, e.g., of the procedure described earlier in conjunction with FIG. 4.

The computer program 610 may be configured as a computer program code structured in computer program modules 610a-610f. Hence, in an exemplifying embodiment, the code in the computer program of the arrangement 600 comprises a sending module 610a, for send to a UE a signaling message to switch the UE from a fixed UL-DL TDD configuration to a flexible UL-DL TDD configuration. The computer program 610 further comprises a subframe set determining module 610b, for determining a set of DL subframes based on the fixed UL-DL TDD configuration and a reference DL TDD configuration of the flexible UL-DL TDD configuration. The computer program 610 further comprises a scheduling module 610c, for scheduling DL transmissions for the UE only within the determined set of DL subframes. The computer program may further comprise a receiving module 610d, for receiving a response to the signaling message to confirm the completion of the switching from the UE. The computer program may further comprise a blind detecting module 610e, for performing blind detection in PUCCH resources corresponding to both a reference UL TDD configuration and the reference DL TDD configuration of the flexible UL-DL TDD configuration, in UL subframes association with the determined set of DL subframes. The computer program 610 may comprise further modules, illustrated as module 610f, e.g. for controlling and performing other related procedures associated with BS's operations.

The computer program modules could essentially perform the actions of the flow illustrated in FIG. 4, to emulate the arrangement 501 in the BS 500. In other words, when the different computer program modules are executed in the processing unit 606, they may correspond, e.g., to the units 510-550 of FIG. 5.

Although the code means in the embodiments disclosed above in conjunction with FIG. 6 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the BS.

Although the present technology has been described above with reference to specific embodiments, it is not intended to be limited to the specific form set forth herein. For example, the embodiments presented herein are not limited to the existing TDD configuration; rather they are equally applicable to new TDD configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method for use in a base station (BS) configuring a user equipment (UE) to switch from a fixed uplink-downlink (UL-DL) time division duplex (TDD) configuration to a flexible UL-DL TDD configuration, the method comprising:
   sending, to the UE, a signaling message to switch the UE from the fixed UL-DL TDD configuration to the flexible UL-DL TDD configuration;
   determining a set of DL subframes based on the fixed UL-DL TDD configuration and a reference DL TDD configuration of the flexible UL-DL TDD configuration; and
   scheduling DL transmissions for the UE only within the determined set of DL subframes.

2. The method of claim 1, further comprising:
   receiving, from the UE, a response to the signaling message to confirm completion of the switching; and
   responsive to receiving the response to the signaling message that confirms completion of the switching, scheduling DL transmissions for the UE based on the reference DL TDD configuration of the flexible UL-DL TDD configuration.

3. The method of claim 1, wherein
   a DL subframe having a UL subframe for acknowledgement (ACK) or non-acknowledgement (NACK) response common in both the fixed UL-DL TDD configuration and the reference DL TDD configuration of the flexible UL-DL TDD configuration is determined as a DL subframe in the set of DL subframes.

4. The method of claim 1, wherein
   a DL subframe having the following properties is determined as a DL subframe in the set of DL subframes:
   the DL subframe per se is a fixed DL subframe in both the fixed UL-DL TDD configuration and the reference DL TDD configuration of the flexible UL-DL TDD configuration; and
   a UL subframe associated with the DL subframe is a fixed UL subframe in both the fixed UL-DL TDD configuration and the reference DL TDD configuration of the flexible UL-DL TDD configuration.

5. The method of claim 1, wherein
   the fixed UL-DL TDD configuration and the reference DL TDD configuration of the flexible UL-DL TDD configuration are both selected from a group of consisting of UL-DL TDD configuration 0, UL-DL TDD configuration 1, and UL-DL TDD configuration 2.

6. The method of claim 5, wherein
   the set of DL subframes is determined or pre-defined as subframe 1, subframe 6, or both subframe 1 and subframe 6.

7. The method of claim 1, further comprising:
   in case where an acknowledgement (ACK) or a non-acknowledgement (NACK) is received on physical uplink control channel (PUCCH), performing blind detection in physical uplink control channel (PUCCH) resources corresponding to both a reference UL TDD configuration and the reference DL TDD configuration of the flexible UL-DL TDD configuration, in UL subframes association with the determined set of DL subframes.

8. The method of claim 7, further comprising:
   determining whether the UE is in the flexible UL-DL TDD configuration based on a result of the blind detection.

9. The method of claim 8, further comprising:
   after the UE is determined in the flexible UL-DL TDD configuration, scheduling DL transmissions for the UE based on the reference DL TDD configuration of the flexible UL-DL TDD configuration.

10. The method of claim 7, wherein in case ACK or NACK multiplexing is used, PUCCH ACK or NACK states are limited within a pre-defined set of states.

11. The method of claim 1, wherein
    in case where an ACK or a NACK is received on physical uplink shared channel (PUSCH) and ACK or NACK bundling is used, a ACK or NACK bundling level is pre-defined.

12. The method of claim 1, wherein
    in case where an ACK or a NACK is received on PUSCH and ACK or NACK multiplexing is used, the ACK or NACK is detected and decoded according to a pre-defined ACK or NACK encoding and mapping scheme.

13. A base station (BS), comprising:
    a sending unit configured to send, to a user equipment (UE), a signaling message to switch the UE from a fixed uplink-downlink (UL-DL) time division duplex (TDD) configuration to a flexible UL-DL TDD configuration;
    a subframe set determining unit configured to determine a set of DL subframes based on the fixed UL-DL TDD configuration and a reference DL TDD configuration of the flexible UL-DL TDD configuration; and
    a scheduling unit configured to schedule DL transmissions for the UE only within the determined set of DL subframes.

14. The BS of claim 13, further comprising:
    a receiving unit configured to receive, from the UE, a response to the signaling message to confirm completion of the switching; and
    wherein the scheduling unit is further configured to schedule DL transmissions for the UE based on the reference DL TDD configuration of the flexible UL-DL TDD configuration, after the receiving unit receives the response.

15. The BS of claim 13, wherein
    the subframe set determining unit is configured to determine a DL subframe having a UL subframe for ACK or NACK response common in both the fixed UL-DL TDD configuration and the reference DL TDD configuration of the flexible UL-DL TDD configuration as a DL subframe in the set of DL subframes.

16. The BS of claim 13, wherein
    the subframe set determining unit is configured to determine a DL subframe having the following properties as a DL subframe in the set of DL subframes:
    the DL subframe per se is a fixed DL subframe in both the fixed UL-DL TDD configuration and the reference DL TDD configuration of the flexible UL-DL TDD configuration; and
    a UL subframe associated with the DL subframe is a fixed UL subframe in both the fixed UL-DL TDD configuration and the reference DL TDD configuration of the flexible UL-DL TDD configuration.

17. The BS of claim 13, wherein
    the fixed UL-DL TDD configuration and the reference DL TDD configuration of the flexible UL-DL TDD configuration are both selected from a group consisting of UL- DL TDD configuration 0, UL-DL TDD configuration 1, and UL-DL TDD configuration 2.

18. The BS of claim 17, wherein
the subframe set determining unit is configured to determine or pre-define the set of DL subframes as subframe 1, subframe 6, or both subframe 1 and subframe 6.

19. The BS of claim 13, further comprising:
a blind detecting unit configured to, in case where an acknowledgement (ACK) or a non-acknowledgement (NACK) is received on physical uplink control channel (PUCCH), perform blind detection in PUCCH resources corresponding to both a reference UL TDD configuration and the reference DL TDD configuration of the flexible UL-DL TDD configuration, in UL subframes association with the determined set of DL subframes.

20. The BS of claim 19, wherein the scheduling unit is further configured to determine whether the UE is in the flexible UL-DL TDD configuration based on a result of the blind detection.

21. The BS of claim 20, wherein
the scheduling unit is further configured to schedule DL transmissions for the UE based on the reference DL TDD configuration of the flexible UL-DL TDD configuration, after the UE is determined in the flexible UL-DL TDD configuration.

22. The BS of claim 19, wherein in case ACK or NACK multiplexing is used, PUCCH ACK or NACK states are limited within a pre-defined set of states.

23. The BS of claim 13, wherein
in case where an ACK or a NACK is received on physical uplink shared channel (PUSCH) and ACK or NACK bundling is used, a ACK or NACK bundling level is pre-defined.

24. The BS of claim 13, wherein
in case where an ACK or a NACK is received on PUSCH and ACK or NACK multiplexing is used, the ACK or NACK is detected and decoded according to a pre-defined ACK or NACK encoding and mapping scheme.

* * * * *